United States Patent [19]

Van Erden et al.

[11] Patent Number: 4,892,175

[45] Date of Patent: Jan. 9, 1990

[54] WRAP SPRING CLUTCH/BRAKE APPARATUS WITH HELPER CLUTCH MECHANISM

[75] Inventors: Donald Van Erden, Wildwood; Donald Noren, Glenview, both of Ill.

[73] Assignee: Illinois Tool Works Inc., Glenview, Ill.

[21] Appl. No.: 265,957

[22] Filed: Nov. 2, 1988

[51] Int. Cl.$^4$ ............................................. F16D 67/02
[52] U.S. Cl. ................................. 192/12 BA; 192/26; 192/48.3; 192/104 C
[58] Field of Search ................... 192/12 BA, 17 D, 26, 192/104 C; 101/228, 93.18

[56] References Cited

U.S. PATENT DOCUMENTS

| | | | |
|---|---|---|---|
| 704,575 | 7/1902 | Pintsch | 192/104 C X |
| 2,816,638 | 12/1957 | Campbell | 192/104 C |
| 3,559,781 | 2/1971 | Brunelle | 192/12 BA |
| 3,924,716 | 12/1975 | Brewer | 192/104 C X |
| 4,760,903 | 8/1988 | Stegelmeier et al. | 192/12 BA X |

Primary Examiner—Rodney H. Bonck
Attorney, Agent, or Firm—John P. O'Brien; Davis Chin

[57] ABSTRACT

A wrap spring clutch/brake apparatus includes a clutch mechanism for supplying increased frictional torque at low rotational speeds to a load. The clutch mechanism is formed of an inner cylindrical-shaped member, an outer annular member disposed concentrically around the inner cylindrical-shaped member, and a garter spring disposed concentrically around the outer annular member. The outer annular member is formed of a plurality of identical-shaped segmented fly-weights. Each segmented fly-weight has an inner arcuate section and an outer arcuate section disposed in a spaced apart relationship from the inner arcuate section by intermediate section. The inner arcuate section is disposed to be frictionally engaged with the outer circumference of the inner cylindrical-shaped member at lower rotational speeds to add increased frictional torque to the shaft output and is adapted for radial movement away from the frictional engagement with the inner member at relatively high rotational speeds.

14 Claims, 2 Drawing Sheets

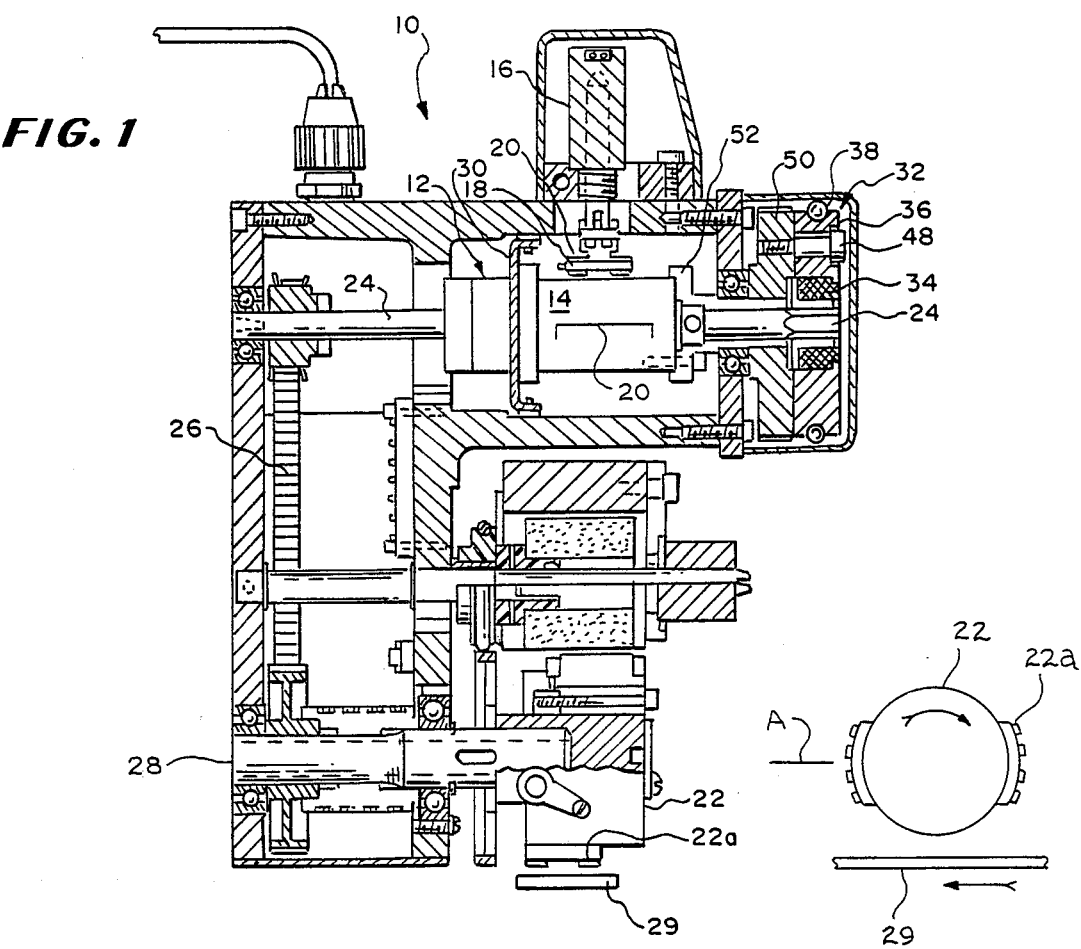
FIG. 1
FIG. 1(a)
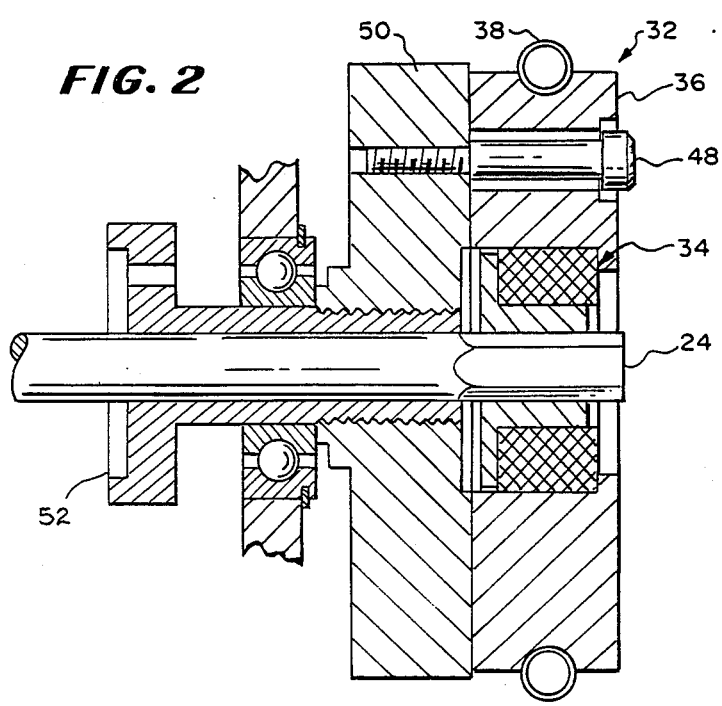
FIG. 2

WRAP SPRING CLUTCH/BRAKE APPARATUS WITH HELPER CLUTCH MECHANISM

BACKGROUND OF THE INVENTION

This invention relates generally to wrap spring clutch and brake devices and more particularly, it relates to a wrap spring clutch/brake apparatus which includes a helper clutch mechanism for supplying increased frictional torque at lower rotational speeds, thereby eliminating any error in the starting/stopping point of a load.

As is known to those skilled in the art, wrap spring clutch/brake devices are used for starting and stopping a load so that it stops at the same desired point without cumulative error. In such clutch/brake devices, two control tangs are provided to hold either the clutch spring or the brake spring open or unengaged with a stop collar. When the clutch and brake control tangs rotate with a continuously rotating hub input, the hub input and a shaft output are positively engaged by the clutch spring and the brake spring is disengaged. When the brake control tang is locked by the stop collar, the brake spring wraps down to engage the shaft output to a stationary brake hub. At the same time, the clutch spring unwraps slightly allowing the hub input to rotate freely.

Since there is a spring differential between the time of disengagement of the clutch spring and the engagement of the brake spring, the shaft output connected generally to a load will continue to rotate due to the spring differential. Therefore, the amount of rotation of the shaft output will be dependent upon the load. Accordingly, these prior art clutch/brake devices have the unfortunate aspect of being very inertia sensitive and that inertia must be "tuned" for the device to function accurately. In other words, the clutch/brake device will operate accurately for only a particular rotational speed for a given load. When such clutch/brake devices are driven at variable speeds for the given load, variable inertia will be present and thus, the accurate positioning operation is significantly reduced.

At very low speeds, the given load will have a very low inertia which may prevent the output shaft from continuing to rotate after the disengagement of the clutch spring and before engagement of the brake spring (spring differential). As a result, the load will not be starting and stopping at the same desired position. In order to overcome this problem, the present invention provides a helper clutch mechanism which supplies increased frictional torque at lower rotational speeds to the shaft output, thereby insuring accurate starting and stopping of a load at the same desired position without cumulative error.

SUMMARY OF THE INVENTION

Accordingly, it is a general object of the present invention to provide an improved wrap spring clutch/brake apparatus which has been traditionally unavailable.

It is an object of the present invention to provide a wrap spring clutch/brake apparatus which includes a helper clutch mechanism for supplying increased frictional torque at lower rotational speeds.

It is another object of the present invention to provide a wrap spring clutch/brake apparatus which includes a clutch mechanism formed of an inner cylindrical-shaped member, an outer annular member disposed concentrically around the inner member, and a garter spring disposed concentrically around the outer member.

It is still another object of the present invention to provide a wrap spring clutch/brake apparatus which includes a clutch mechanism having an outer member formed of a plurality of identical-shaped segment portions disposed concentrically around an inner member.

In accordance with these aims and objectives, the present invention is concerned with the provision of a wrap spring clutch/brake apparatus of the type having a constantly rotating hub input, a clutch shaft output, a stationary brake hub, a clutch spring and a brake spring. The clutch spring is wrapped down for positively engaging the hub input and the shaft output. The brake spring is wrapped down for engaging the shaft output and the brake hub. A load is drivingly connected to the shaft output. A clutch mechanism is provided for supplying increased frictional torque at lower rotational speeds to the load. The clutch mechanism is operatively coupled to the hub input and includes an inner cylindrical-shaped member attached to the shaft output, an outer annular member disposed concentrically around the cylindrical-shaped member, and a garter spring disposed concentrically around the outer member.

The outer member is formed of a plurality of identical-shaped segment portions. Each segment portion has an inner arcuate section and an outer arcuate section disposed in a spaced apart relationship from the inner arcuate section by an intermediate section. The inner arcuate section of the segment portion is disposed to be frictionally engaged with the circumference of the inner cylindrical-shaped member at very low rotational speeds to add increased frictional torque to the shaft output. The inner arcuate section is adapted for radial movement away from frictional engagement with the inner cylindrical-shaped member at relatively high rotational speeds. As a result, the load is started and stopped accurately at the same desired position without cumulative error.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a partial, cross-sectional view of a wrap spring clutch/brake apparatus constructed in accordance with the principles of the present invention;

FIG. 1a is a side elevational view of the printing head of FIG. 1 in the non-printing position;

FIG. 2 is an enlarged view of the helper clutch mechanism of FIG. 1;

DESCRIPTION OF THE PREFERRED EMBODIMENT

Figure 3:
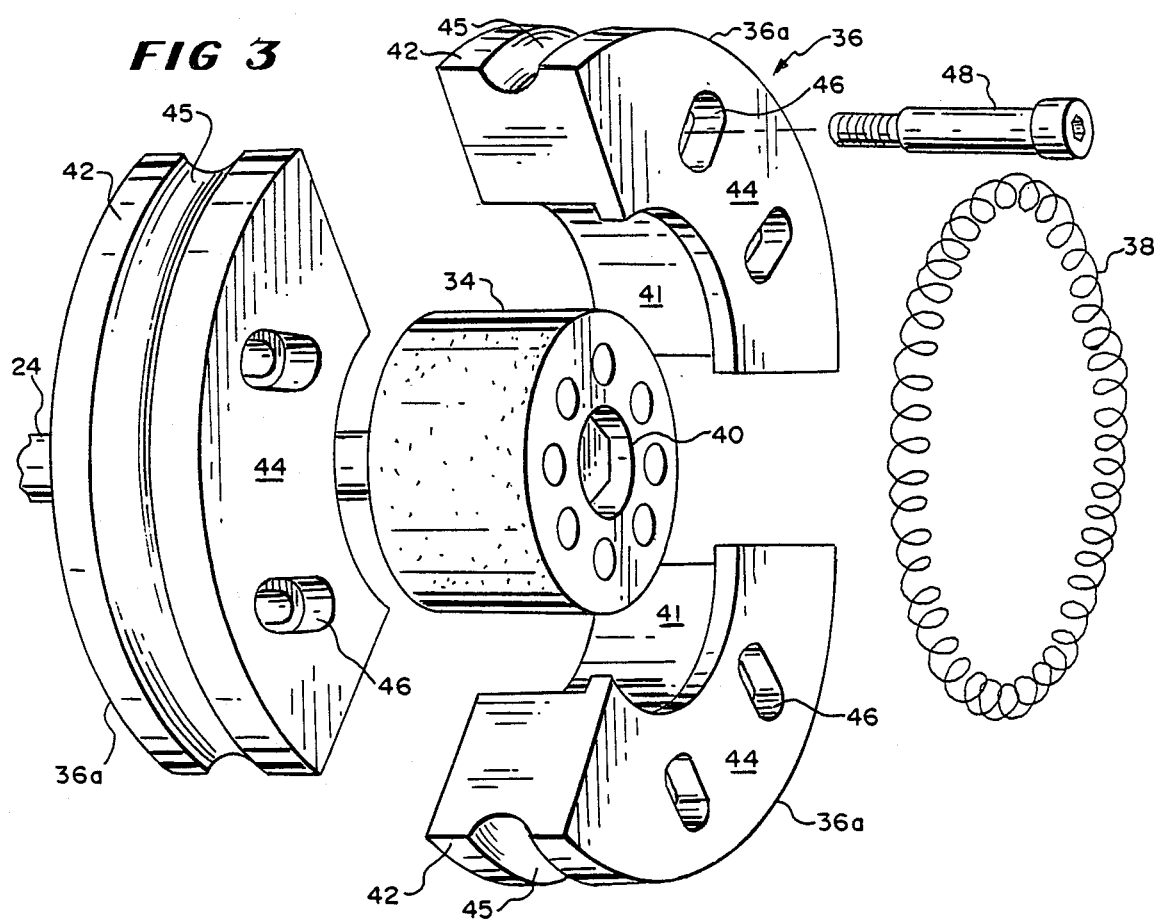
FIG. 3 is an exploded view of the helper clutch mechanism of the present invention.

Referring now in detail to the drawings, there is shown in FIG. 1 a partial cross-sectional view of a wrap spring clutch/brake apparatus 10 of the present invention. The clutch/brake apparatus 10 includes a wrap spring clutch/brake unit 12 of the CB Series type commercially available from Warner Electric. The clutch/brake unit 12 has a clutch spring (not shown) and a brake spring (also not shown) mounted within a housing 14. The clutch/brake unit 12 is actuated by a solenoid 16 which releases an actuator pawl 18 from engagement with a cam 20 formed on the housing 14. The clutch/brake apparatus 10 of the present invention shown in association with a printing system in FIG. 1 is not intended to serve as a limitation upon the scope or teachings thereof, but is merely for the purpose of convenience of illustration of one example of its application.

In the printing application, the clutch/brake unit 12 controls the turning of a printer head 22 via a clutch shaft output 24, a timing belt 26, and a printer head shaft 28. The printing head serves as a load and is connected to the printer head shaft 28. The timing belt 26 is used for drivingly coupling the clutch shaft output 24 to the printer head shaft 28. When a work-piece 29 to be printed upon is sensed by a photoelectric control device (not shown) to be in the correct position, a sense signal is generated to actuate the solenoid 16 which causes the actuator pawl 18 to be pulled back from the cam 20 allowing the spring clutch to wrap down. This will, in turn, cause the input hub of the clutch/brake unit 12 to be positively engaged with the clutch shaft output 24. The shaft output 24 is rotated one revolution, and the printing head 22 is rotated one-half of a revolution due to the 2:1 ratio of the timing belt 26. As a result, the surface 22a of the printing head 22 is indexed from the non-print position illustrated in FIG. 1a to the proper rotational position, as shown in FIG. 1, for printing on the work-piece 29 passing underneath the printing head 22.

After the one revolution of the clutch shaft output 24, the cam 20 will again become engaged with the actuator pawl 18 which allows the clutch spring to unwrap and after the spring differential, the brake spring will wrap down. This causes the shaft output 24 to become engaged with a stationary brake hub on reaction plate 30. Due to the inertia of the load (printing head 22), the shaft output 24 will continue to rotate so as to return the surface 22a of the printing head 22 to its horizontal non-print position at point A of FIG. 1a. The higher the rotational speed load (high inertia energies), the tighter the brake spring wraps down. Thus, at very low speeds, the load will have a low inertia so that the shaft output will be unable to return the surface 22a to the non-print position at the point A, but for the present invention.

In order to ensure that the surface 22a of the printing head 22 will be rotated back to the point A at the very low rotational speed, the clutch/brake apparatus 10 of the present invention includes a helper clutch mechanism 32 for supplying increased frictional torque to the clutch shaft output 24 at lower rotational speeds. This serves to eliminate any cumulative error in the starting and stopping point of a given load. As can be seen from FIGS. 2 and 3, the clutch mechanism 32 includes an inner cylindrical-shaped member 34 which is fixedly attached to one end of the clutch shaft output 24. The clutch mechanism 32 further includes an outer annular member 36 which is disposed concentrically around the inner cylindrical-shaped member 34. The clutch mechanism also includes a garter spring 38 which is disposed concentrically around the outer member 36.

The inner cylindrical-shaped member 34 is made of a frictional material and has a central opening 40 for receiving and fixed attachment to the shaft output 24. The outer annular member 36 is formed of three identical-shaped segmented fly-weights 36a. Each of the segmented fly-weights 36a has an inner arcuate section 41 and an outer arcuate section 42 disposed in a spaced apart relationship from the inner arcuate section 4 by an intermediate section 44, which can best be seen from FIG. 3 of the drawings.

The inner arcuate sections 41 conform to the outer circumference of the inner cylindrical-shaped member 34. The outer arcuate sections 42 is formed with a central groove 45 for receiving the garter spring 38. The intermediate section 44 is provided with a plurality of oval-shaped recesses 46 for receiving shoulder screws 48. The shoulder screws 48 are used to movably mount the clutch mechanism 32 to an input driver sprocket 50 (FIGS. 1 and 2).

Figure 4:
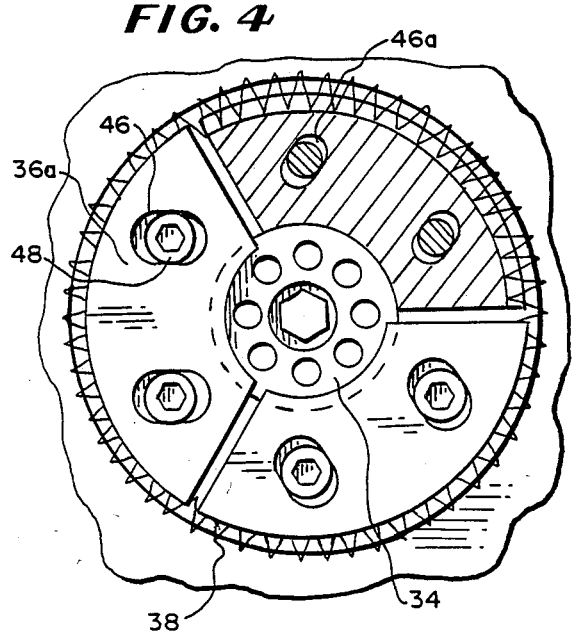
FIG. 4 is an end view of the helper clutch mechanism at a very low rotational speed.

The clutch/brake apparatus 10 further includes an adaptor driver 52 which is drivingly connected to the constantly rotating input hub of the clutch/brake unit 12. Further, the input drive sprocket 50 is operatively connected to the adaptor driver 52. As a result, the helper clutch mechanism 32 will be constantly rotating at the same speed as the input hub. In FIG. 4, there is illustrated the relationship of the segmented flyweights 36a with respect to the inner cylindrical-shaped member 34 at a very low rotational speed. As can be seen, the segmented fly-weights 36a are moved only slightly and outwardly along the recesses 46 in the radial direction away from the inner member 34. Thus, the inner arcuate sections 41 are frictionally engaged with the circumference of the inner member 34. The head portion of the shoulder screws 48 are substantially adjacent the outermost radial portion 46a of the oval-shaped recesses 46. As a result, the segmented flyweiqhts 36a function to supply increased frictional torque to the clutch shaft output 24.

Figure 5:
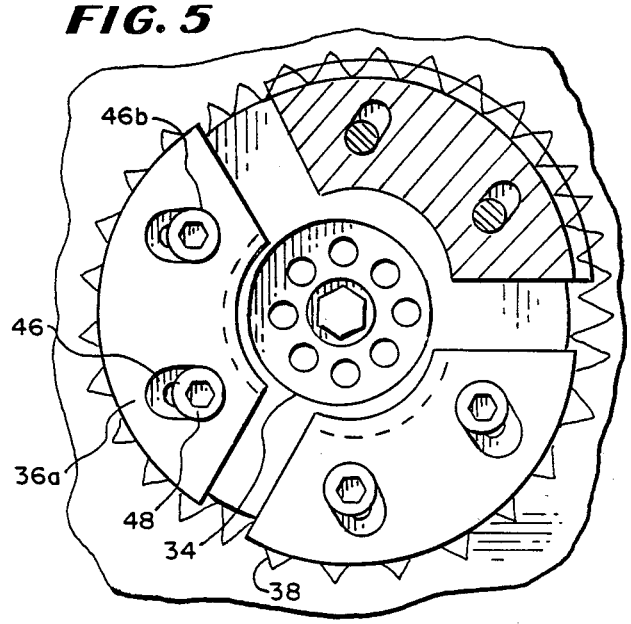
FIG. 5 is an end view of the helper clutch mechanism at a relatively high rotational speed.

In FIG. 5 of the drawings, there is illustrated the relationship of the segmented fly-weights 36a with respect to the inner cylindrical-shaped member 34 at a relatively high rotational speed. As can be seen, the segmented fly-weights 36a are moved outwardly in the radial direction along the recesses 46 by centrifugal force so that the inner arcuate sections 41 are disengaged from or come out-of-contact with the circumference of the inner member 34. The head portions of the shoulder screws 48 are substantially adjacent the innermost radial portion 46b of the oval-shaped recesses 46. This is caused by the centrifugal force which overcomes the resilient pressure from the garter spring 38. As a result, the clutch mechanism 32 does not add any frictional torque to the clutch shaft output 24 at high speeds. As the rotational speed is reduced, the garter spring 38 will exert a force so as to urge the segmented fly-weights 36a into frictional engagement with the inner member 34, thereby creating the increased frictional torque.

From the foregoing detailed description, it can thus be seen that the present invention provides a wrap spring clutch/brake apparatus which includes a helper clutch mechanism for supplying increased frictional torgue at lower rotational speeds, thereby eliminating any error in the starting/stopping point of a load. The clutch mechanism of the present invention is formed of an inner cylindrical-shaped member, an outer annular member disposed concentrically around the cylindrical member, and a garter spring disposed concentrically around the outer member. The outer annular member is formed of a plurality of identical-shaped segmented flyweights.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. In a wrap spring clutch/brake apparatus of the type having a constantly rotating hub input, a clutch shaft output, a stationary brake hub, a clutch spring and a brake spring, said clutch spring being wrapped down for positively engaging the hub input and the shaft output, said brake spring being wrapped down for engaging the shaft output and the brake hub, a load being drivingly coupled to the shaft output, wherein the improvement comprises a clutch mechanism for supplying increased frictional torque at lower rotational speeds to the load, comprising:

said clutch mechanism being operatively coupled to said hub input and including an inner cylindrical-shaped member attached to the shaft output, an outer annular member disposed concentrically around said inner cylindrical-shaped member, and a garter spring disposed concentrically around said outer annular member;

said outer annular member being formed of a plurality of identical-shaped sigmented fly-weights, each segmented fly-weight having an inner arcuate section and an outer arcuate section disposed in a spaced apart relationship from said inner arcuate section by an intermediate section; and said inner arcuate section of said segmented fly-weights being disposed to be frictionally engaged with the circumference of said inner cylindrical-shaped member at lower rotational speeds to add increased frictional torque to said shaft output and being adapted for radial movement away from the frictional engagement with the inner member at relatively high rotational speeds.

2. In a wrap spring clutch/brake apparatus as claimed in claim 1, wherein said intermediate section is provided with a plurality of oval-shaped recesses for receiving shoulder screws for movably mounting said segmented fly-weights.

3. In a wrap spring clutch/brake apparatus as claimed in claim 2, wherein said segmented fly-weights are moved radially and outwardly along said recesses so as to be disengaged rom said inner cylindrical-shaped member.

4. In a wrap spring clutch/brake apparatus as claimed in claim 3, wherein said outer annular member is provided with a groove for receiving the garter spring.

5. In a wrap spring clutch/brake apparatus as claimed in claim 1, wherein said plurality of segmented fly-weights comprises three segmented fly-weights.

6. In a wrap spring clutch/brake apparatus as claimed in claim 1, wherein said inner cylindrical-shaped member has a central opening for receiving and attachment to the clutch shaft output.

7. A wrap spring clutch/brake apparatus for supplying increased frictional torque to a load at lower rotational speeds, comprising:

a clutch/brake unit of the type having a constantly rotating hub input, a clutch shaft output, a stationary brake hub, a clutch spring and a brake spring, said clutch spring being wrapped down for positively engaging the hub input and the shaft output, said brake spring being wrapped down for engaging the shaft output and the brake hub;

a load shaft having a load connected thereto;

gear train means for drivinqly coupling said clutch shaft output to said load shaft;

a clutch mechanism being operatively coupled to said hub input and including an inner cylindrical-shaped member attached to the shaft output, an outer annular member disposed concentrically around said inner cylindrical-shaped member, and a garter spring disposed concentrically around said outer annular member;

said outer annular member being formed of a plurality of identical-shaped segmented fly-weights, each segmented fly-weight having an inner arcuate section and an outer arcuate section disposed in a spaced apart relationship from said inner arcuate section by an intermediate section; and said inner arcuate section of said segmented fly-weights being disposed to be frictionally engaged with the circumference of said inner cylindrical-shaped member at lower rotational speeds to add increased frictional torque to said shaft output and being adapted for radial movement away from the frictional engagement with the inner member at relatively high rotational speeds, whereby the load is started and stopped accurately at the sam position without accumulative error.

8. A wrap spring clutch/brake apparatus as claimed in claim 7, wherein said intermediate section is provided with a plurality of oval-shaped recesses for receiving shoulder screws for movably mounting said segmented fly-weights.

9. A wrap spring clutch/brake apparatus as claimed in claim 8, wherein said segmented fly-weights are moved radially and outwardly along said recesses so as to be disengaged from said inner cylindrical-shaped member.

10. A wrap spring clutch/brake apparatus as claimed in claim 9, wherein said outer annular member is provided with a groove for receiving the garter spring.

11. A wrap spring clutch/brake apparatus as claimed in claim 7, wherein said plurality of segmented fly-weights comprises three segmented fly-weights.

12. A wrap spring clutch/brake apparatus as claimed in claim 7, wherein said inner cylindrical-shaped member has a central opening for receiving and attachment to the clutch shaft output.

13. A wrap spring clutch/brake apparatus as claimed in claim 7, wherein said load is a printer head.

14. A wrap spring clutch/brake apparatus for supplying increased frictional torque to a load at lower rotational speeds, comprising:

a clutch/brake unit of the type having a constantly rotating hub input, a clutch shaft output, a stationary brake hub, a clutch spring and a brake spring clutch spring being wrapped down for positively engaging the hub input and the shaft output, said brake spring being wrapped down for engaging the shaft output and the brake hub;

a load shaft having a load connected thereto;

gear train means for drivingly coupling said clutch shaft output to said load shaft;

means for frictionally engaging said clutch shaft output at lower rotational speeds so as to supply increased frictional torque to the load; and said engaging means including a plurality of segmented fly-weights and being moved radially and outwardly away from said shaft output so as to be disengaged therefrom at relatively high rotational speeds by centrifugal force.

* * * * *